United States Patent

[11] 3,617,090

| [72] | Inventors | Samuel Edgar Huffman<br>Eaton;<br>Kenneth R. Davisson, Severence, both of Colo. |
|---|---|---|
| [21] | Appl. No. | 857,924 |
| [22] | Filed | Sept. 15, 1969 |
| [45] | Patented | Nov. 2, 1971 |
| [73] | Assignee | Hydraulics Unlimited Mfg. Co.<br>Eaton, Colo. |

[54] HOIST FOR VEHICLE MOUNTED BOX
6 Claims, 5 Drawing Figs.
[52] U.S. Cl............................................ 298/22 J,
298/22 P
[51] Int. Cl......................................... B60p 1/16
[50] Field of Search.......................... 298/22 R,
22 J, 22 O, 22 B, 11, 18, 17 S, 22 P, 19 R

[56] References Cited
UNITED STATES PATENTS

| 1,188,932 | 6/1916 | Griffith.......................... | 298/22 |
| 2,332,961 | 10/1943 | Wood............................. | 298/22 |
| 2,490,532 | 12/1949 | Maxon ........................... | 298/22 |
| 2,730,401 | 1/1956 | Rea................................. | 298/22 |
| 2,731,293 | 1/1956 | Hutchinson ................... | 298/17 X |
| 3,135,555 | 6/1964 | McCaskey...................... | 298/22 |

*Primary Examiner*—Milton Buchler
*Assistant Examiner*—F. K. Yee
*Attorney*—Drake & Crandell & Batchelder ABSTRACT: The hoist for a vehicle mounted box or bed is a jackknife or scissors-type hoist powered by a pressure fluid motor, and includes two parallel lifting mechanisms mounted outboard of the vehicle chassis, on the extending ends of a torsion bar journaled transversely on the chassis, and with the free ends of the hoist mechanism secured to the underside of the vehicle box. The box is hinged at the rear end of the vehicle for tilting movement.

INVENTORS
S. EDGAR HUFFMAN
KENNETH R. DAVIDSON
BY
Ralph F. Crandell
ATTORNEY 3,617,090

HOIST FOR VEHICLE MOUNTED BOX

BACKGROUND OF THE INVENTION

The present invention relates to a hoist mechanism for use with vehicle mounted load-carrying beds or boxes, and more particularly to a pressure fluid actuated jackknife-type hoist mechanism finding particular but not necessarily exclusive use for lifting the load-carrying box of a dirigible automotive vehicle such as a pickup truck.

OBJECTS OF THE INVENTION

It is the principal object of the present invention to provide a simple, compact and easily mounted hoist mechanism finding particular but not necessarily exclusive use as a hoist mechanism for the load-carrying box of a pickup truck.

Another object of the invention is to provide a hoist mechanism of the above type which requires less force to operate than hoist mechanisms heretofore known, while providing stability in the event of unbalanced loads carried in the box being lifted to prevent twisting stresses on the box.

A further object of the present invention is to provide a hoist mechanism which can be readily and simply mounted on the vehicle without relocating the vehicle equipment such as mufflers, brake lines, and other accessories contained on and within the truck chassis.

Still a further object of the present invention is to provide a hoist of the foregoing character which provides for stability in forced distribution, results in less wear and tear and less stress and strain on the truck box and chassis.

Still a further object of the present invention is to provide a hoist of the above character which provides a fast return of an empty box to its level position.

Yet a further object of the present invention is to provide a hoist of the above type which affords lower maintenance costs, can be readily mounted without extensive changes on the vehicle, reduces installation and maintenance time and charges, and can be mounted without welding to the truck frame or box.

Still a further object of the present invention is to provide a hoist of the above character which can utilize either a separate pressure fluid source on the vehicle or an adjunct pressure fluid source such as a power steering pump.

Yet a further object is to provide a hoist which is readily adopted for use not only with smaller type pickup tracks, but for application on trucks of greater size and capacity.

SUMMARY OF THE INVENTION

The foregoing objects are met by a hoist mechanism embodying the present invention wherein a pair of jackknife or scissors-type hoist mechanisms are mounted outboard of the chassis frame between the chassis and the box. The hoists are interconnected by means of a torsion bar journaled transversely of the frame, and are powered by piston- and cylinder-type fluid pressure actuated motors. The truck body, bed or box is pivoted at one end to the frame and is engaged at its other end by the hoists which provide a lifting action when pressure fluid is applied to the hoist motors. The hoist mechanisms each comprise an obtuse-angled bellcrank device affixed one at each outboard end of the torsion bar for rotation therewith, with one of the legs of each bellcrank adapter extending generally parallel to the chassis and the other extending upwardly at an angle therefrom. The hoist mechanisms further include a pair of generally parallel pivot bars affixed to the bellcrank and extending generally parallel to the vehicle chassis. Lifting arms are pivotally affixed between the free ends of the pivot bars and the underside of the body box. A piston- and cylinder-type pressure fluid motor acts at a pivot point intermediate the ends of the lifting arm and the inclined leg of the bellcrank connector. In the operation of the hoist, extension of the piston jackknifes the lifting arm and pivot bar to lift the box and swing it upwardly about the chassis hinge. In the event one of the sides of the box contains a heavier load than the other, an equalizing force will be transmitted through the torsion bar so that the heavier side will be lifted by a greater force but at the same relative speed as the lighter side, thereby preventing twisting or bending of the box.

DESCRIPTION OF THE PREFERRED EMBODIMENT

Figure 1:
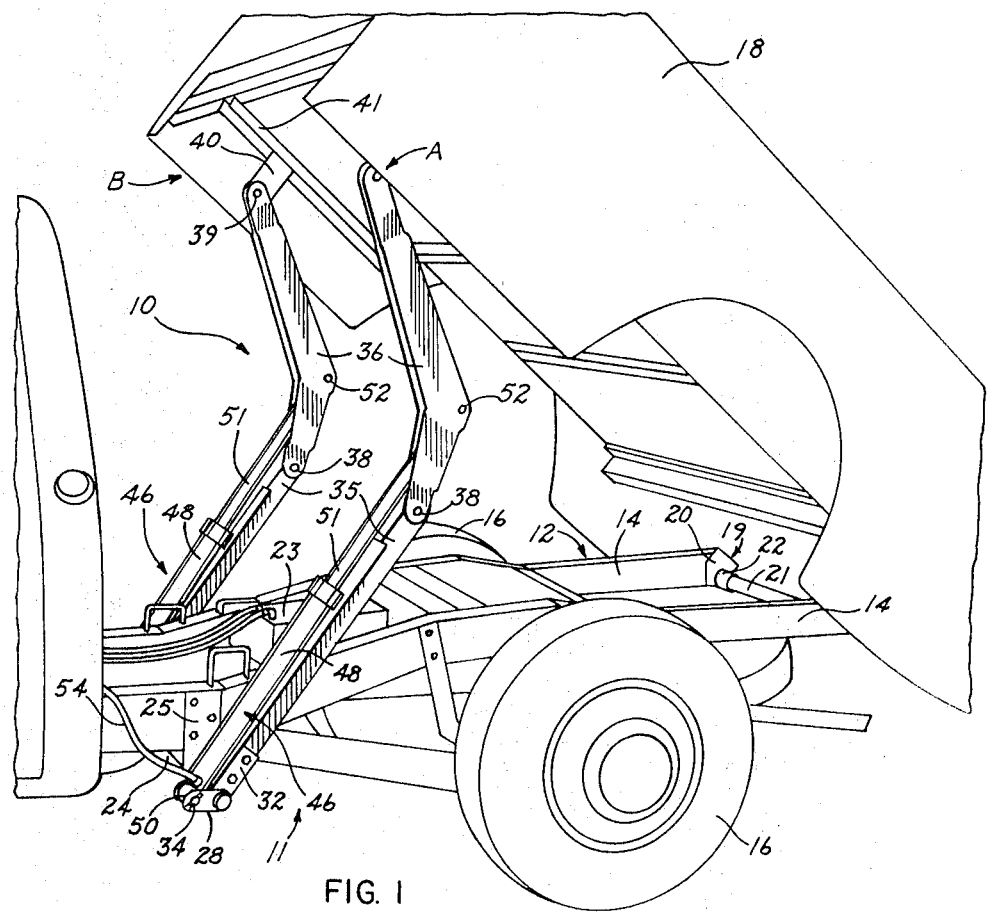
FIG. 1 is an isometric view of a vehicle mounted box and hoist mechanism embodying the present invention with the box in a tilted position.
Figure 2:
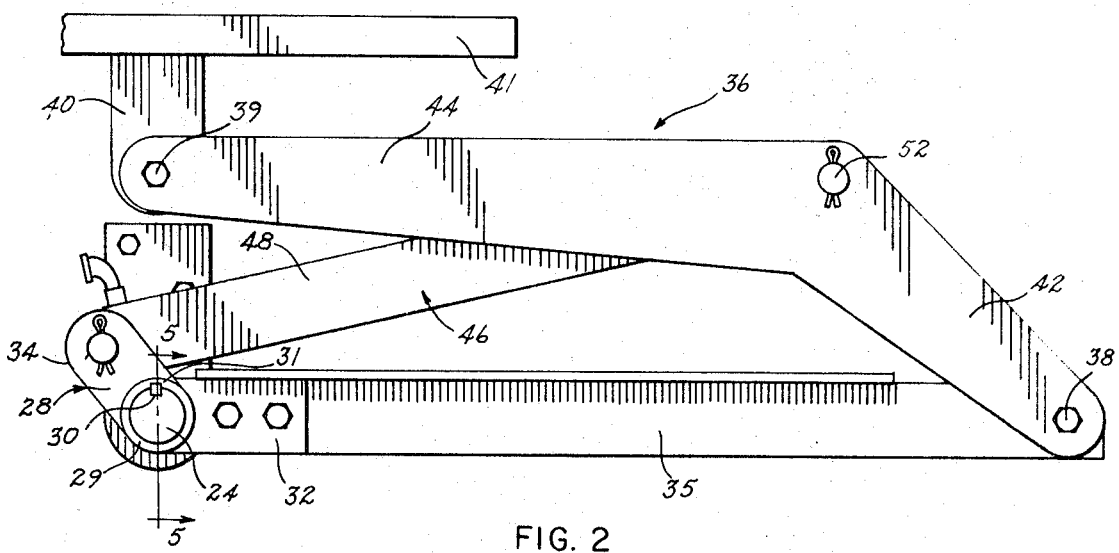
FIG. 2 is a side elevation view of a hoist mechanism embodying the present invention.
Figure 3:
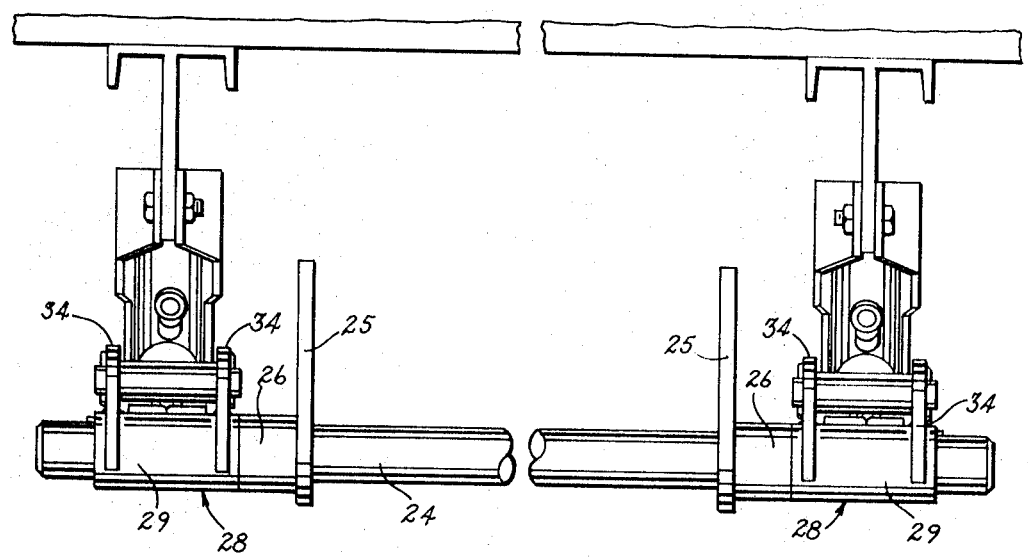
FIG. 3 is a front elevation view of the hoist mechanism shown in FIG. 2.
Figure 4:
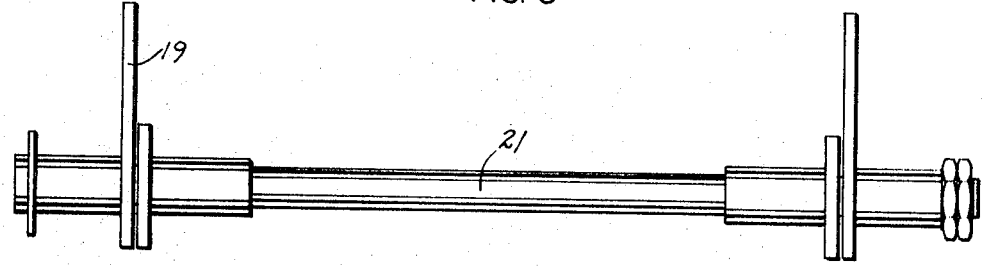
FIG. 4 is an enlarged rear elevation view of a vehicle box hinge structure.
Figure 5:
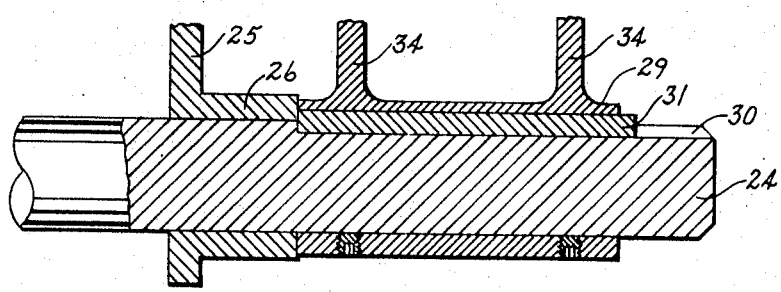
FIG. 5 is a fragmentary enlarged section view taken substantially in the plane of the line 5—5 on FIG. 2.

A hoist mechanism, indicated generally by the numeral 10, embodying the present invention is shown in operative association with a wheeled, dirigible, automotive vehicle such as a pickup truck 11. The vehicle is comprised of a chassis 12 having a pair of elongated frame members 14 extending the length thereof and supported in the usual manner by axles and wheels 16. A motor (not shown) is provided at one end of the chassis 12, and the other end mounts a tiltable load-carrying box or body member 18. For tilting the box 18 upwardly to a dumping position, the box 18 is pivotally mounted at the rear end of the chassis 12 by means of pivot hinges 19 formed by depending support members 20 engaged with a pivot rod 21 journaled in bushings 22 mounted on the rearward ends of the frame members 14. The box is conventionally formed of reinforced sheet metal construction and where appropriate is provided with a tailgate, fenders and the like. Special box constructions are not required for use with the hoist embodying the present invention. This invention is intended for use with the conventional box supplied as original equipment with the vehicle.

For powering the hoist 10 there is provided, in operative association with the usual vehicle engine, an appropriate hydraulic system including a pump 23, and associated source of pressure fluid and control. Alternatively, the pump 23 and fluid source of the conventional power steering mechanism for the vehicle may be utilized to power the hoist.

The hoist mechanism embodying the present invention is adapted to raise the box 18 to a tilted position for dumping the contents thereof. In many instances, a load contained within the box will be unevenly distributed so that the box will carry a greater weight at one side than at the other. Because some vehicles, such as pickup trucks, are intended to be relatively lightweight vehicles, it is not desirable to incorporate in or add to the load-carrying box heavy reinforcing beams and other structural members. So long as the load contained is evenly distributed, problems are not encountered. Where, however, the load is unbalanced, there is danger that the box will be twisted and permanently bent out of shape as it is lifted to a dump position.

In order to lift the box regardless of the load weight distribution therein, the hoist mechanism embodying the present invention includes dual lifting arm units mounted outboard of the chassis frame members 14 and engaged with the underside of the box at widely spaced apart points, together with lift-stabilizing torsion means interconnecting the outboard hoists. To this end, the hoist mechanism comprises a torsion bar 24 positioned generally transversely of the chassis frame members 14 and rotatably supported thereon by means of mounting brackets 25. The brackets are bolted, welded or otherwise attached to the frame members, and at their depending ends carry mounting sleeves 26 journaling the torsion bar 24 for axial rotation. The ends of the torsion bar extend outwardly of the brackets and mount at their outermost ends obtuse-angled bellcrank hoist arm connectors 28.

In order to securely engage the torsion bar, each of the bellcrank connectors includes a sleeve 29 having a key-slot 30 therein for receiving a key 31 mounted in the end of the torsion bar 24. One leg of the bellcrank is formed at the central portion of the connector sleeve 29 by a pair of closely spaced, parallel mounting ears 32 extending outwardly from the sleeve 29 normal to the sleeve axis. The second leg of the bellcrank is formed by a second pair of the mounting ears 34 normal to the sleeve axis but spaced outwardly of the first pair of mounting ears 32, and directed at an obtuse angle with the respect thereto. The two sets of ears 32, 34, define with the sleeve 29, an obtuse-angled bellcrank connector 28 having legs extending at an obtuse angle with respect to each other.

In order to lift or tilt the box 18 upwardly about the frame hinges 19, a jackknife or scissors-type hoist mechanism is provided including a pivot bar 35 and lifting arm 36 mounted outboard of the chassis 12 at each side thereof. The pivot bar 35 is securely bolted or welded at one end to the central ears 32 forming the first leg of the bellcrank connector 28, and is in turn pivotally hinged at its free end by a pintle or pivot pin 38 to one end of an associated lifting arm 36. The free end of each lifting arm is pivotally hinged, again by an appropriate pintle or pivot pin 39 to depending brackets 40 secured by welding or bolting to the underside of the truck box 18. For supporting the brackets 40, mounting channels 41 may be welded or otherwise secured to the underside of the truck box. The lifting arms 36 are generally obtuse-angled in shape with a shorter leg 42 hinged to the pivot arm 35 and a longer leg 44, extending generally parallel to and coextensive with the underlying pivot arm when the hoist is in the collapsed position and hinged to the truck box bracket 40.

For jackknifing or swinging the pivot bar 35 and lifting arms 36 about their hinge pivots 38 to an open or extended position, in order to lift or tilt the truck box into an upwardly inclined position, as shown in FIG. 1, hydraulic motors 46 such as piston and cylinder type pressure fluid operative motors are provided for each of the hoist units. As shown in the drawing, the cylinder portion 48 of each motor is secured, as by a bushing and pivot pin structure 50 to the upwardly inclined outer ears 34 forming the second leg of the adjacent bellcrank connector 28. The piston portion 51 of the motor 46 is pivotally engaged by a pivot pin 52 to an associated lifting arm 36 at a point intermediate its ends. The lifting arms, as described above are desirably angle-shaped and the piston 51 is engaged with the adjacent arm at the apex of the angle. This construction allows for maximum extension of the piston with a lever arm of sufficient length to provide the desired lifting force to the truck box 18.

For powering the motors of the hoist units, an appropriate source of fluid pressure is provided on the vehicle. This may be an independent pressure fluid pump and motor 23, as shown in the drawings, or alternatively, a pressure fluid pump such as is conventionally used for the power steering system of the vehicle may be utilized with suitable taps, conduits and controls. A conduit 54 from the pump, motor and control valve on the vehicle serves each pressure fluid motor.

In the instant embodiment, the lifting arms 36 are formed as generally boxlike structures constructed by side plates joined by upper and lower plate weldments. This construction allows the lifting arm 36 and pivot arm 35 of each hoist to be positioned closely together when the box is in the lowered position. With this construction also, the piston and cylinder motor will fit in between the sidewalls of the associated lifting arm when the hoist is in the lowered position. The angled construction of the lifting arms further reduces the overall retracted dimension of the hoist, as the major or longer leg of the lifting arms is positioned substantially parallel to the pivot arm when the hoist is in the collapsed or closed position.

In operation, with the truck box in its lowered position, the pump 23 applies equal fluid pressure within each of the two hydraulic motor cylinders 48. This fluid pressure develops a force which acts along the axis of the piston and cylinder motor 46, applying an upwardly lifting force to the lifting arm 36, and at the same time applying a rotating force to the torsion bar 24 through the obtuse-angled bellcrank connectors 28 fixed at each end thereof. This torsion force tends to rotate the pivot arms 35 in a generally counterclockwise direction, and at the same time tends to swing the lifting arms 36 in a generally clockwise direction. This force separates or jackknifes the pivot arm 35 and lifting arm 36 of each hoist unit, about their common pivot 38, into an open or extended position. The lifting force opening the hoist units is resisted by the box load or reaction applied to the hoist units at the points 39 at which the lifting arms are pivotally mounted to the underside of the box 18. As the cylinder pressure is increased in each of the motors 46, the components of resulting force overcome the downward force of the box 18 and its load at the pivot point 39 between the box and the lifting arm. The cylinder begins to extend and the box is lifted about the chassis hinge pivots 19. As this occurs, the pivot or hinge 52, by which the piston 51 is pivoted to the lifting arm, rotates in a clockwise direction about the pivot or hinge point 38 between the lifting arm 36 and the pivot arm 35. The box 18 then begins to lift and is tilted about the chassis hinge 19 into an upwardly inclined position. When the reactive box loads at both sides of the box are equal, all rotations occur at the same rate and the torsion bar 24 simply rotates in a counterclockwise direction along with the rotation of upward swinging movement of the pivot arms 35.

In the event the box loads are unequal at the two sides of the box, as a result of uneven or unbalanced load distribution therein, the torsion bar 24 becomes a load or force transferring device. Assuming that the load at one side, indicated at A, is greater than the load at the other side, indicated at B, the hoist compensates for such an unequal load distribution. To this end, fluid pressure is applied equally to the motor cylinders 48 up to the point where at which sufficient motor force is obtained to overcome the box force at side A. This side then attempts to begin an upward rotation; however, it is still prevented from this upward swinging movement by the resistance to rotation by the torsion bar 24 reacting against the still unattained motor force required to overcome the load at side B. Therefore, the cylinder force at the side A of the box with the least load must continue to increase. This motor force increase occurs simultaneously on both sides of the box, but the additional force is not needed for lifting at the lighter side A of the box, so that a certain amount of the motor force on the side A is transferred, through the torsion bar 24, to help or assist the motor force at the heavier side B overcome the heavier load. The cylinder pressure continues to increase in both motors 46 until the force or load at the heavier side B of the box is overcome. At that point, both sides A and B of the box 18 will begin to move upwardly with a uniform lifting or swinging movement. During this lifting process the torsion bar 24 transfers torque from the pivot arm at the lighter loaded side A of the box to the pivot arm at the more heavily loaded side B. In this manner, no differential movement or twisting of the truck box 18 will occur because the hoist lifting arms 36 will move at the same upwardly tilting rate as a result of the force adjustment provided by the torsion bar 24 connecting the two hoist units.

The hoist units, and thereby the truck box 18 are lowered by decreasing or releasing the pressures within the cylinders 48. During lowering of the box 18, the previously described processes are reversed, again preventing unevenly distributed loads in the box from twisting or bending the box.

The hoist mechanism 10 described above may be readily adapted to larger size vehicles. Furthermore, the relative direction or position of the lifting arm and pivot arm may be such that the same jackknife forwardly instead of rearwardly as shown in the drawings.

We claim:

1. A hoist mechanism for lifting a load-carrying box hinged for tilting movement on the chassis of a wheeled, dirigible automotive vehicle, said hoist comprising, in combination, a torsion bar extending transversely of the chassis at a point spaced from the hinge between the box and the chassis, means journaling said torsion bar for axial rotation with respect to said chassis, an obtuse-angled bellcrank connector means fixed at each end of said torsion bar outboard of said chassis and having first and second leg means extending therefrom and forming an obtuse angle with respect to each other, a jackknife hoist means fixedly secured to the first leg of each said bellcrank connector means and pivotally engaged with the underside of the load-carrying box, and power means pivotally mounted between said hoist means and the second leg of said bellcrank connector means, each said hoist means and associated power means being mounted outboard of the vehicle chassis, said power means being actuable to jackknife said hoist means to lift said load-carrying box while applying a load-unbalance compensating torque to said torsion bar whereby lifting forces at each side of the load-carrying box are equalized in accordance with the distribution of the load carried therein.

2. A hoist mechanism as defined in claim 1 wherein each said jackknife hoist means comprises an elongated pivot bar fixed to the first leg of said bellcrank connector means and a lifting arm pivotally hinged at one end to the underside of said load-carrying box.

3. A hoist mechanism as defined in claim 1, wherein said jackknife hoist means comprises an elongated pivot bar fixed at one and to said first bellcrank leg, and an obtuse-angled lifting arm the respective legs of which are of unequal length, means pivotally hinging the shorter leg of said lifting arm to said pivot bar, means for pivotally hinging the longer leg of said lifting arm to the underside of said load-carrying box and means at the apex of said legs for pivotally hinging said lifting arm to said power means.

4. A hoist mechanism as defined in claim 1, wherein said power means comprises a piston and cylinder motor associated with each jackknife hoist means and a source of pressure fluid on said vehicle for powering said motors, and control means for controlling the application of pressure fluid to and the discharge of pressure fluid from said motors to respectively raise or lower said load-carrying box.

5. A hoist mechanism as defined in claim 4, wherein said source of pressure fluid comprises a power steering pump secured to and operatively controlling the steering of said wheeled vehicle.

6. A hoist mechanism for lifting a load-carrying box hinged for tilting movement on the chassis of a wheeled, dirigible, automotive vehicle, said hoist comprising, in combination, a torsion bar extending transversely of the vehicle chassis at a point spaced from the hinge between the box and the chassis, means journaling said torsion bar for axial rotation with respect to said chassis, bellcrank connector means fixed at each end of said torsion bar outboard of said chassis, a pair of parallel elongated pivot bars fixed respectively to said bellcrank connector means, a pair of lifting arms, means pivotally hinging each lifting arm at one end to the free end of an adjacent one of said pivot bars, means pivotally hinging each lifting arm at its other end to the underside of the load-carrying box at spaced apart points thereon, a pair of hoist motors, means pivotally hinging a motor between each said bellcrank connector means and a point intermediate the ends of a respective lifting ram, said motors being operable for jackknifing said pivot bars and said lifting arms about the pivot means joining the same while applying a load unbalance compensating torque to said torsion bar whereby lifting forces at each side of the load-carrying box are equalized in accordance with the distribution of the load carried by the box.

* * * * *